(12) United States Patent
Soya et al.

(10) Patent No.: US 6,190,451 B1
(45) Date of Patent: Feb. 20, 2001

(54) ADMIXTURE OF CEMENT COMPOSITION

(75) Inventors: Sumio Soya; Makoto Saito; Tohru Yamamoto; Yasuhito Wakabayashi, all of Kanagawa (JP)

(73) Assignee: Showa Denko Kabushiki Kaisha, Tokyo (JP)

( * ) Notice: Under 35 U.S.C. 154(b), the term of this patent shall be extended for 0 days.

(21) Appl. No.: 09/369,149

(22) Filed: Aug. 5, 1999

Related U.S. Application Data

(60) Provisional application No. 60/095,435, filed on Aug. 5, 1998.

(30) Foreign Application Priority Data

Dec. 8, 1997 (JP) ................................................ 9-336993

(51) Int. Cl.$^7$ ............................. C04B 24/04; C04B 24/12
(52) U.S. Cl. .................... 106/808; 106/727; 106/823; 562/553; 562/571
(58) Field of Search .................................. 106/727, 808, 106/823; 562/553, 571

(56) References Cited

U.S. PATENT DOCUMENTS 5,417,759 * 5/1995 Huddleston .

FOREIGN PATENT DOCUMENTS 57-109885 * 7/1982 (JP) .
60-016845 * 1/1985 (JP) .
7-173469 * 7/1995 (JP) .

* cited by examiner

*Primary Examiner*—Anthony Green
(74) *Attorney, Agent, or Firm*—Sughrue, Mion, Zinn, Macpeak & Seas, PLLC

(57) ABSTRACT

An additive for an admixture of a cement composition, especially, a retarder of a cement composition, capable of exhibiting excellent retardation effect with a smaller addition amount and easily controlling the retardation time by adjusting the addition amount. An admixture of a cement composition, comprising a cement and at least one iminodiacetic acid or salt thereof represented by formula (I):

$$W-Y-N\begin{matrix}CH_2COOM\\CH_2COOM\end{matrix} \quad (I)$$

wherein the M groups each independently represents a hydrogen atom, an alkali metal atom, an ammonium group or a substituted ammonium group; Y represents a divalent alkyl group having from 1 to 5 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group.

12 Claims, No Drawings

ADMIXTURE OF CEMENT COMPOSITION

CROSS REFERENCE TO RELATED APPLICATIONS

This application is an application filed under 35 U.S.C. §111(a) claiming benefit pursuant to 35 U.S.C. §119(e)(i) of the filing date of the Provisional Application No. 60/095,435 filed Aug. 5, 1998 pursuant to 35 U.S.C. §111(b).

FIELD OF THE INVENTION

The present invention relates to an additive for an admixture of a cement composition, especially, a retarder which exerts set retardation effect when it is added to a cement paste, mortar, concrete or cement hydraulic product analogous thereto (hereinafter collectively called a cement composition). The retarder shows excellent capability of controlling retardation time by the adjustment of the addition amount and does not exhibit water reduction effect.

BACKGROUND OF THE INVENTION

In recent years, with improvement of architectural techniques and diversification of cement application methods, various additives for admixtures of a cement composition are being used according to the purpose of execution including the scale of the structure and the site of placement.

Of these, a retarder for retarding the setting time of the cement composition is widely used. The retarder is previously added to the cement composition or coated on the surface or formwork of concrete still in the unhardened state for various purposes, for example, for preventing a reduction in fluidity of the concrete between hydration and transportation/placement to thereby ensure the working time or for junction integrating adjacent joint parts in the placement process for constructing a large concrete structure by sequentially placing a plurality of concrete layers and/or concrete sections.

The retarder acts such that the active component thereof couples with calcium ion liberated by the initial hydration of cement, into a certain form (for example, formation of a complex compound) and this moiety covers the surface of a cement particle to thereby bring out the effect of retarding the setting of cement. Known examples of active components include hydroxycarboxylic acids or salts thereof such as gluconic acid, glucoheptonic acid, arabonic acid, malic acid, citric acid, tartaric acid, pyruvic acid and glycolic acid, saccharides (e.g., monosaccharides, disaccharides, trisaccharides, oligosaccharides, sugar-alcohols) such as saccharose, glucose, fluctose, galactose, mannose, lactose, raffinose, dextrin and sorbitol, and (hydrogen) carbonates of alkali metals, such as potassium carbonate and sodium carbonate. A retarder (composition) comprising these components individually or in combination of two or more thereof is being used or studied (see, for example, JP-A-54-60372 (the term "JP-A" as used herein means an "unexamined published Japanese patent application"), JP-A-59-156950, JP-B-4-20866 (the term "JP-B" as used herein means an "examined Japanese patent publication")). In particular, a retarder having blended therein sodium gluconate as a hydroxycarboxylate is one of the most widely used retarders.

The amount of retarder added to the cement composition is usually from 0.1 to 0.7 wt % based on the weight of cement in practical use and thereby, a retardation time of from 1 to 24 hours can be achieved, though it may vary depending on the ambient conditions. The retarder is usually used by adjusting the addition amount according to the desired retardation time.

However, these conventional retarders have the following problems. For example, in the case of saccharose as a saccharide, great retardation may be obtained but the distribution thereof is large and the capability of controlling the retardation time is poor. In the case of sodium gluconate which is a hydroxycarboxylate and which is widely used, the retardation effect is accompanied with water reduction effect, accordingly, the water-cement ratio must be adjusted whenever it is used by taking account of the incidental water reduction effect as well as the adjustment of the addition amount depending on the desired retardation effect, thus, cumbersome operations are necessary. As described above, the amount of the conventional retarder added is in practice from 0.1 to 0.7 wt % based on the weight of cement. However, in view of strength of the cement composition after setting and profitability, it is preferred to achieve higher retardation effect with a smaller addition amount. Existing retarders, even a retarder composition having blended therein two or more active components, have not yet succeeded in solving the problems with respect to the capability of controlling the retardation time and the cumbersomeness the incidental occurrence of undesired water reduction effect which accompanies their use.

The retarder of a concrete composition must show excellent retardation effect with a smaller addition amount, exhibit superior capability of controlling the retardation time as a result of the adjustment of the addition amount, and be free of incidental occurrence of water reduction effect.

SUMMARY OF THE INVENTION

As a result of extensive investigations to solve the above-described problems, the present inventors have found that an additive for an admixture of a cement composition, mainly comprising a specific iminodiacetic acid (salt) shows a retardation effect equal to or higher than that of conventional retarders with a smaller addition amount because of its excellent retardation effect. This can successfully control the retardation time and at the same time, does not exhibit water reduction effect. The present invention has been accomplished based on this finding.

The iminodiacetic acids (salts) for use in the present invention are at least one or more of the compounds represented by the following formula (I) and are synthesized as a corresponding amino acid or amino alcohol derivative using known methods:

(I)

wherein the M groups each independently represents a hydrogen atom, an alkali metal atom, an ammonium group or a substituted ammonium group; Y represents a divalent alkyl group having from 1 to 5 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group.

DETAILED DESCRIPTION OF THE INVENTION

In the iminodiacetic acids (salts) represented by formula I of the present invention, the —COOM group is preferably a carboxyl group or an alkali metal salt or ammonium salt thereof. The alkali metal atom is sodium or potassium and preferably is sodium.

Examples of groups represented by Y in formula I are set forth below.

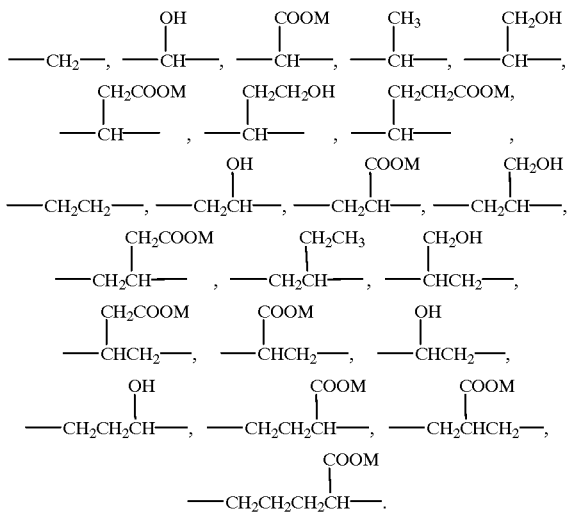

Examples of iminodiacetic acids (salts) include α-alanine-N,N-diacetic acid (salt), β-alanine-N,N-diacetic acid (salt), aspartic acid-N,N-diacetic acid (salt), glutamic acid-N,N-diacetic acid (salt), serine-N,N-diacetic acid (salt), ethanolamine-N,N-diacetic acid (salt), iminodiacetic acid (salt) and nitrilotriacetic acid (salt), among which glutamic acid-N,N-diacetic acid (salt) is preferably used in this invention. These iminodiacetic acids (salts) are compounds having a chelating ability and are considered to exert a hardening retardation effect as a result of coupling with the above-described free calcium due to a chelating action. The retarder of the present invention contains one or more of these iminodiacetic acids (salts).

The iminodiacetic acid (salt) is added to cement in an amount of from 0.005 to 3 wt % based on the weight of cement, preferably from 0.01 to 0.3 wt %, whereby a retardation time of from 1 to 24 hours can be achieved, though this may vary depending on the ambient conditions. The retardation time is controlled by increasing or decreasing the addition amount and a desired retardation time depending on the execution time or purpose can be easily obtained. The retarder of the present invention does not show a water reduction effect and therefore, the cumbersome process of adjusting the amount of water added each time the amount of the retarder added increases or decreases is eliminated. The retarder of the present invention may be added at the mixing of concrete or after the concrete is loaded on an agitator-body truck, either in the form of powder or an aqueous solution. Usually, a reaction solution of the iminodiacetic acids obtained by a normal synthesis method is preferably used as it is. At this time, the iminodiacetic acids (salts) may be either in the form of an acid or an alkali metal salt. When the retarder of the present invention is used in the step of washing finish of concrete, a sufficiently large effect may be obtained simply by coating the retarder on the surface or formwork of concrete still in an unhardened state.

The retarder of the present invention may appropriately contain a thickener (e.g., methyl cellulose, carboxy methyl cellulose, acrylamide, a copolymer of acrylamide with sodium acrylate, sodium alginate, a polysaccharide, a modified starch), a stickiness inhibitor (e.g., wheat flour, silica fume, plastic fine powder, diatomaceous earth), a dispersant (e.g., a lignin sulfonate, a polymer product of naphthalene sulfonic acid) or water, which are commonly blended with this kind of retarders.

The admixture of cement composition using the retarder of the present invention is not limited with respect to the kind of cement constituting the cement hydraulic product or the kind of aggregate or another additive blended. For example, the kind of cement may be appropriately selected depending on the end use or required capabilities from various cements commonly available on the market, such as ordinary portland cement, early strength portland cement, moderate heat portland cement, blast-furnace cement, silica cement, white portland cement, fly-ash cement, lower heating cement, cement for ground and oil well cement.

The admixture of the present invention is an excellent retarder of a cement composition, having superior retardation effect and, accordingly, capability of giving an effect equal to or higher than that of conventional retarders with a smaller addition amount, exhibiting good controllability of the retardation time and showing no water reduction effect.

EXAMPLES

The present invention is described in greater detail below by referring to the Examples and Comparative Examples, however, the present invention should not be construed as being limited thereto.

Respective evaluations in the Examples and Comparative Examples were performed in a room at a temperature of 20° C. and a humidity of 65% RH.

Unless otherwise indicated, all parts, percents, ratios and the like are by weight.

Example 1 and Comparative Example 1

Sample: To ordinary portland cement, a retarder of Example (retarder of the present invention) or Comparative Example (conventional retarder) was added in an amount of from 0.05 to 0.3% (weight ratio to the cement) to prepare a cement paste having a water-cement ratio of 30%.

Evaluation of Fluidity: Fluidity was evaluated by rating the expansion using a flow table. The test was performed according to "JIS R 5201, Physical Test Method for Cements" and a flow value was measured immediately after mixing, after 30 minutes or after 60 minutes.

The results obtained are shown in Table 1 below.

TABLE 1

| Example, Retarder (component) | Addition Ratio (wt %) | Flow Value (mm*mm) | | |
|---|---|---|---|---|
| | | Immediately After Mixing | After 30 Minutes | After 60 Minutes |
| Not added (control) | 0 | 168*167 | 165*168 | 161*158 |
| ADA-3Na[*1] | 0.05 | 165*166 | 166*166 | 159*163 |
| | 0.1 | 166*169 | 165*167 | 158*158 |
| | 0.3 | 164*166 | 167*168 | 159*162 |
| SEDA-3Na[*2] | 0.05 | 167*166 | 166*166 | 158*160 |
| | 0.1 | 169*169 | 166*164 | 166*164 |
| | 0.3 | 165*167 | 168*167 | 162*159 |
| GLDA-4Na[*3] | 0.05 | 165*167 | 164*167 | 163*161 |
| | 0.1 | 165*160 | 163*165 | 158*160 |
| | 0.3 | 166*168 | 167*165 | 162*159 |

TABLE 1-continued

| Example, Retarder (component) | Addition Ratio (wt %) | Flow Value (mm*mm) | | |
|---|---|---|---|---|
| | | Immediately After Mixing | After 30 Minutes | After 60 Minutes |
| ASDA-4Na*4 | 0.05 | 169*165 | 164*165 | 164*163 |
| | 0.1 | 169*166 | 167*167 | 159*161 |
| | 0.3 | 167*167 | 166*164 | 162*159 |
| HEIDA-2Na*5 | 0.05 | 166*169 | 165*167 | 162*159 |
| | 0.1 | 169*168 | 168*166 | 162*161 |
| | 0.3 | 168*167 | 166*165 | 162*163 |
| Comparative Example, Retarder | | | | |
| Sodium gluconate | 0.05 | 176*179 | 175*177 | 172*169 |
| | 0.1 | 187*189 | 188*186 | 182*183 |
| | 0.3 | 205*207 | 203*204 | 199*202 |
| Saccharose | 0.05 | 168*166 | 163*164 | 162*164 |
| | 0.1 | 168*167 | 165*166 | 160*162 |
| | 0.3 | 166*167 | 166*165 | 167*164 |

*1ADA-3Na trisodium α-alanine-N,N-diacetate
*2SEDA-3Na trisodium serine-N,N-diacetate
*3GLDA-4Na tetrasodium glutamic acid-N,N-diacetate
*4ASDA-4Na tetrasodium aspartic acid-N,N-diacetate
*5HEIDA-2Na disodium ethanolamine-N,N-diacetate It is seen from the results in Table 1 that the flow value when the retarder of the present invention was added was almost equal to the value when a retarder was not added, whereas when sodium gluconate was used, the flow value increased, revealing generation of water reduction effect. Thus, the retarders of the present invention were verified to have no water reduction effect.

Example 2 and Comparative Example 2

Sample: To ordinary portland cement, a retarder of Example (retarder of the present invention) or Comparative Example (conventional retarder) was added in an amount of from 0.05 to 0.3% (weight ratio to the cement) to prepare a cement paste having a normal consistency.

Evaluation of Retardation Effect: The retardation effect was evaluated by performing a setting test of cement pastes using a Vicat needle apparatus. According to "JIS R 5201, Physical Test Method for Cements", the retardation time was determined in comparison with the initial setting time or final setting time of the case where a retarder was not added (control).

The results obtained are shown in Table 2 below.

TABLE 2

| Example, Retarder (component) | Addition Ratio (wt %) | Initial Setting (Hr) | Final Setting (Hr) |
|---|---|---|---|
| Not added (control) | 0 | 3.4 | 5.4 |
| ADA-3Na*1 | 0.05 | 6.8 | 8.7 |
| | 0.1 | 11.2 | 12.9 |
| | 0.3 | 26.8 | 30.2 |
| SEDA-3Na*2 | 0.05 | 6.5 | 8.1 |
| | 0.1 | 12.6 | 13.4 |
| | 0.3 | 25.9 | 31.0 |
| GLDA-4Na*3 | 0.05 | 6.9 | 8.7 |
| | 0.1 | 11.6 | 13.4 |
| | 0.3 | 27.2 | 30.0 |
| ASDA-4Na*4 | 0.05 | 7.0 | 8.8 |
| | 0.1 | 11.5 | 13.7 |
| | 0.3 | 27.8 | 30.1 |
| HEIDA-2Na*5 | 0.05 | 6.8 | 7.8 |
| | 0.1 | 12.0 | 13.6 |
| | 0.3 | 26.9 | 29.7 |
| Comparative Example, Retarder | | | |
| Sodium gluconate | 0.05 | 4.0 | 6.1 |
| | 0.1 | 8.2 | 10.4 |
| | 0.3 | 12.1 | 14.3 |
| Saccharose | 0.05 | 14.5 | 6.6 |
| | 0.1 | 9.8 | 12.8 |
| | 0.3 | 10.4 | 14.1 |

It is seen from the results in Table 2 that the retarders of the present invention are superior in retardation effect to conventional retarders and facilitate control of retardation time.

Example 3 and Comparative Example 3

Sample: To ordinary portland cement, a retarder of Example (retarder of the present invention) or Comparative Example (conventional retarder) was added in an amount of from 0.05 to 0.3% (weight ratio to the cement) to prepare a cement paste having a water-cement ratio of 30%.

Evaluation of Strength: The mixed cement paste was poured into a formwork of 4 cm (length)×4 cm (width)×16 cm (height) while preventing formation of bubbles and cured in a room at a temperature or 20° C. and a humidity of 65% RH for one day. Thereafter, the hardened product was withdrawn from the form and cured in water at 20° C. The flexural strength of cement hardened products with an age of 7 days or 28 days were determined.

The results obtained are shown in Table 3 below.

TABLE 3

| Example, Retarder (component) | Addition Ratio (Wt %) | Flexural Strength (kgf/cm²) | |
|---|---|---|---|
| | | Age of 7 Days | Age of 28 Days |
| Not added (control) | 0 | 31.1 | 39.2 |
| ADA-3Na*1 | 0.05 | 31.3 | 39.6 |
| | 0.1 | 30.6 | 39.1 |
| | 0.3 | 20.4 | 28.6 |
| SEDA-3Na*2 | 0.05 | 30.9 | 38.9 |
| | 0.1 | 30.1 | 38.7 |
| | 0.3 | 29.9 | 38.9 |
| GLDA-4Na*3 | 0.05 | 32.0 | 39.8 |
| | 0.1 | 31.3 | 39.4 |
| | 0.3 | 30.7 | 38.9 |
| ASDA-4Na*4 | 0.05 | 31.5 | 39.4 |
| | 0.1 | 30.8 | 39.0 |
| | 0.3 | 30.6 | 38.8 |
| HEIDA-2Na*5 | 0.05 | 31.3 | 39.1 |
| | 0.1 | 30.7 | 38.6 |
| | 0.3 | 30.5 | 38.7 |
| Comparative Example, Retarder | | | |
| Sodium gluconate | 0.05 | 19.8 | 28.0 |
| | 0.1 | 18.3 | 26.4 |
| | 0.3 | 16.1 | 21.7 |
| Saccharose | 0.05 | 20.6 | 28.7 |
| | 0.1 | 19.8 | 27.4 |
| | 0.3 | 18.2 | 26.8 |

It is seen from the results in Table 3 that cement pastes having added thereto the retarder of the present invention had a strength equal to that of the case where a retarder was not added (control).

According to the present invention, a retarder of a cement composition, having no water reducing property and showing excellent retardation effect is provided. Furthermore, the retarder of a cement composition according to the present invention can easily control the retardation time.

While the invention has been described in detail and with reference to specific embodiments thereof, it will be apparent to one skilled in the art that various changes and modifications can be made therein without departing from the spirit and scope thereof.

What is claimed is:

1. An additive for an admixture of a cement composition, comprising at least one iminodiacetic acid or a salt thereof represented by formula (I):

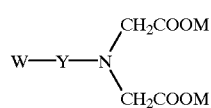

wherein the M groups each independently represents a hydrogen atom, an alkali metal atom, an ammonium group or a substituted ammonium group; Y is selected from the group consisting of the groups shown below:

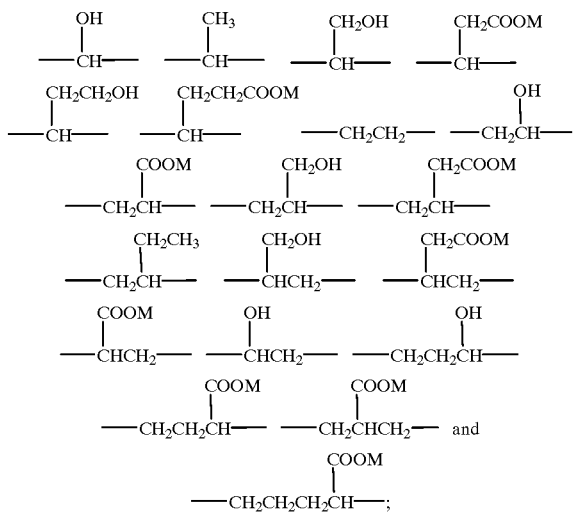

and W represents a hydrogen atom, a hydroxyl group or a COOM group wherein M represents a hydrogen atom, an alkali metal atom, an ammonium group or a substituted ammonium group.

2. The additive for an admixture of a cement composition as claimed in claim 1, wherein the iminodiacetic acid or a salt thereof is α-alanine-N,N-diacetic acid or salt, β-alanine-N,N-diacetic acid or salt, aspartic acid-N,N-diacetic acid or salt, serine-N,N-diacetic acid or salt, or glutamic acid-N,N-diacetic acid or salt.

3. The additive for an admixture of a cement composition as claimed in claim 1, wherein the iminodiacetic acid or a salt thereof is glutamic acid-N,N-diacetic acid or a salt thereof.

4. An admixture of a cement composition, comprising a cement and at least one iminodiacetic acid or a salt thereof represented by formula (I):

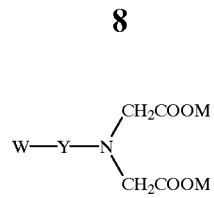

wherein the M groups each independently represents a hydrogen atom, an alkali metal atom, an ammonium group or a substituted ammonium group; Y is selected from the group consisting of the groups shown below:

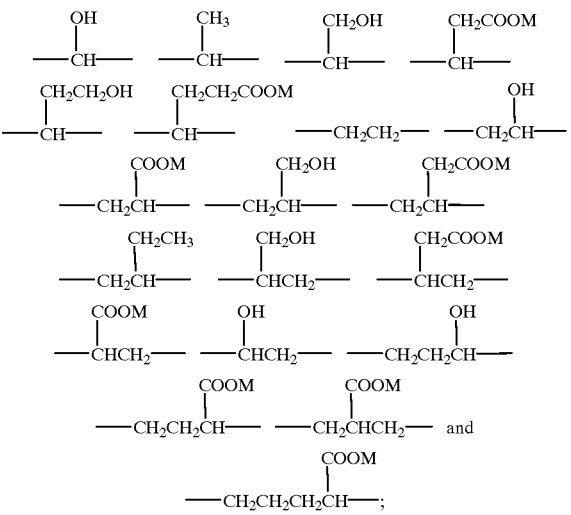

and W represents a hydrogen atom, a hydroxyl group or a COOM group wherein M represents a hydrogen atom, an alkali metal atom, an ammonium group or a substituted ammonium group.

5. The admixture of a cement composition as claimed in claim 4, wherein the iminodiacetic acid or a salt thereof is present in an amount of from 0.005 to 3 wt % based on the weight of the cement.

6. The admixture of a cement composition as claimed in claim 4, wherein the iminodiacetic acid or a salt thereof is α-alanine-N,N-diacetic acid or salt, β-alanine-N,N-diacetic acid or salt, aspartic acid-N,N-diacetic acid or salt, serine-N,N-diacetic acid or salt, or glutamic acid-N,N-diacetic acid or salt.

7. The admixture of a cement composition as claimed in claim 4, wherein the iminodiacetic acid or a salt thereof is glutamic acid-N,N-diacetic acid or a salt thereof.

8. A method of controlling the hardening of cement into concrete, comprising adding a hardening controlling effective amount of at least one iminodiacetic acid or a salt thereof to the cement, wherein the iminodiacetic acid or a salt thereof is represented by formula (I):

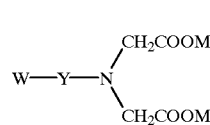

wherein the M groups each independently represents a hydrogen atom, an alkali metal atom, an ammonium group or a substituted ammonium group; Y is selected from the group consisting of the groups shown below:

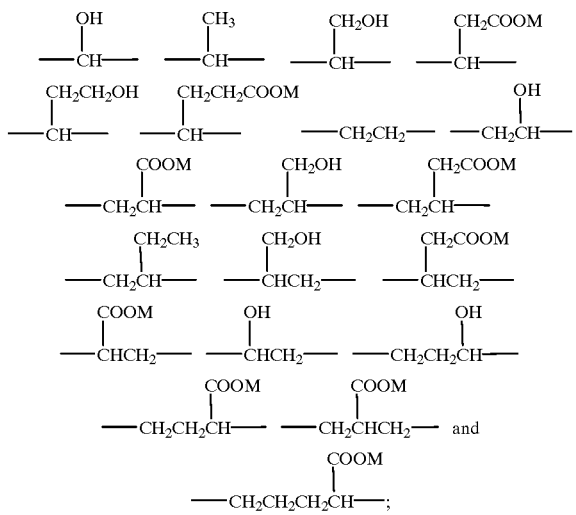

and W represents a hydrogen atom, a hydroxyl group or a COOM group wherein M represents a hydrogen atom, an alkali metal atom, an ammonium group or a substituted ammonium group.

9. The method as claimed in claim 8, wherein the method comprises adding said at least one iminodiacetic acid or salt thereof in an amount of from 0.005 to 3 wt % based on the cement.

10. A method of controlling the hardening of cement into concrete as claimed in claim 8, wherein the iminodiaceitic acid or a salt thereof is represented by formula (1):

wherein the M groups each independently represents a hydrogen atom, an alkali metal atom, an ammonium group or a substituted ammonium group; Y represents a divalent alkyl group having from 1 to 5 carbon atoms and the divalent alkyl group may be substituted by a hydroxyl group or a COOM group wherein M represents a hydrogen atom, an alkali metal atom, an ammonium group or a substituted ammonium group; and W represents a hydrogen atom, a hydroxyl group or a COOM group wherein M represents a hydrogen atom, an alkali metal atom, an ammonium group or a substituted ammonium group.

11. A method of controlling the hardening of cement into concrete as claimed in claim 8, wherein the iminodiacetic acid or a salt thereof is α-alanine-N,N-diacetic acid or salt, β-alanine-N,N-diacetic acid or salt, aspartic acid-N,N-diacetic acid or salt, serine-N,N-diacetic acid or salt, or glutamic acid-N,N-diacetic acid or salt.

12. A method of controlling the hardening of cement into concrete as claimed in claim 8, wherein the iminodiacetic acid or a salt thereof is glutamic acid-N,N-diacetic acid or a salt thereof.

\* \* \* \* \*